United States Patent
Brilka et al.

(10) Patent No.: US 7,499,105 B2
(45) Date of Patent: Mar. 3, 2009

(54) COMPENSATION CIRCUIT FOR FREQUENCY FILTERS

(75) Inventors: Joachim Brilka, Hamburg (DE); Axel Kattner, Seevetal (DE)

(73) Assignee: NXP B.V., Eindhoven (NL)

( * ) Notice: Subject to any disclaimer, the term of this patent is extended or adjusted under 35 U.S.C. 154(b) by 420 days.

(21) Appl. No.: 10/496,555

(22) PCT Filed: Nov. 25, 2002

(86) PCT No.: PCT/IB02/05033

§ 371 (c)(1),
(2), (4) Date: May 25, 2004

(87) PCT Pub. No.: WO03/047096

PCT Pub. Date: Jun. 5, 2003

(65) Prior Publication Data

US 2005/0007496 A1 Jan. 13, 2005

(30) Foreign Application Priority Data

Nov. 28, 2001 (DE) .............. 101 58 357

(51) Int. Cl.
*H04N 5/08* (2006.01)

(52) U.S. Cl. .............. 348/528; 348/678; 348/725; 348/735

(58) Field of Classification Search .......... 348/735–736, 348/729, 737–738, 528, 553–554, 678, E5.113, 348/725; 445/183.1, 210; *H04N 5/08*
See application file for complete search history.

(56) References Cited

U.S. PATENT DOCUMENTS

| 3,832,638 | A | * | 8/1974 | Ohashi et al. | 455/210 |
| 4,157,569 | A | * | 6/1979 | Apeldoorn et al. | 348/528 |
| 6,456,143 | B2 | * | 9/2002 | Masumoto et al. | 327/356 |
| 6,490,441 | B1 | * | 12/2002 | Saito | 455/183.1 |
| 7,075,585 | B2 | * | 7/2006 | Favrat et al. | 348/554 |

* cited by examiner

*Primary Examiner*—Trang U Tran

(57) ABSTRACT

The invention relates to a compensation circuit for filters of a video signal receiver. To compensate a non-linear amplification of a small signal in dependence upon the control of a large signal which is superimposed on the small signal, the invention proposes to detect the control of the large signal and to vary the working point of the filter in dependence upon the control of the large signal. Since the filter amplifies the small signal differently in dependence upon the position of the working point, the non-linearity of the filter can thereby be compensated.

10 Claims, 1 Drawing Sheet

COMPENSATION CIRCUIT FOR FREQUENCY FILTERS

Figure 1:
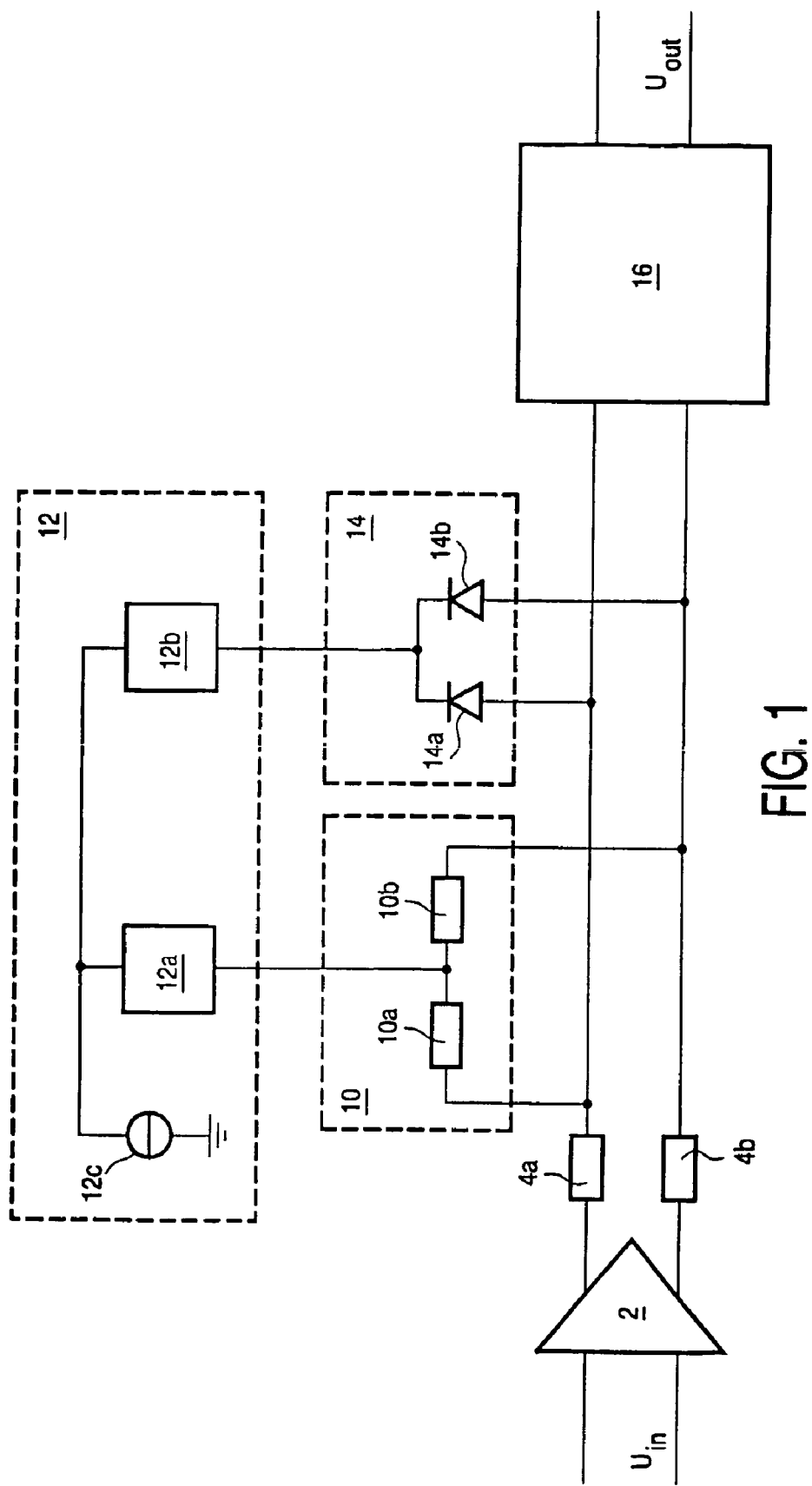

The invention relates to a compensation circuit for frequency filters, particularly IF frequency filters, sound subcarrier filters or sound subcarrier traps of a video signal receiver, particularly a television signal receiver, comprising amplifier means for amplifying a signal, particularly a composite video signal, and filtering means for filtering a frequency range within the signal, the filtering means having a non-linear, control-dependent transfer function.

A composite video signal comprises a picture signal and a sound carrier signal in which the respective information signals are modulated on the carrier signals. To separate picture signals and sound carrier signals, the composite video signal should be divided into a sound carrier signal and a picture signal after demodulation of the IF signal of the composite video signal. To suppress sound carrier signals in the picture signal path, a reliable suppression of the sound carrier is necessary. For this reason, conventional IF stages of television receiver circuits comprise, inter alia, filters with integrated or external sound carrier suppression. To this end, filters are used which, on the one hand, suppress the sound carrier and, on the other hand, amplify the picture signal.

Conventional composite video signals consist of a baseband picture signal and a superimposed sound carrier signal. The baseband picture signal ranges from 0 to 4 or 5 MHz. The picture signal comprises a luminance signal and a carrier-modulated chrominance signal. Furthermore, the composite video signal comprises a carrier signal-modulated sound signal. The chrominance signal is, for example, at a frequency of about 4.43 or 3.56 MHz. To avoid interference in the picture signal, the sound carrier signal must be reliably filtered from the composite video signal by means of a sound carrier trap.

A chrominance signal having a higher frequency, hereinafter referred to as high-frequency chrominance signal, is superimposed on the luminance signal having a lower frequency, hereinafter referred to as low-frequency luminance signal. The amplitude of the superimposed chrominance signal is essentially smaller than the amplitude of the luminance signal. This means that the luminance signal covers a large part of the amplitude of the picture signal. The superimposed chrominance signal is both phase-modulated and amplitude-modulated, by which the chromaticity and the color saturation are determined.

The picture signal is amplified in the filters. The video parameter "differential gain" determines the amplification of the high-frequency chrominance signal with respect to the low-frequency luminance signal.

However, conventional filters have a non-linear amplification of the chrominance signal. This non-linearity is characterized in that the high-frequency chrominance signal is amplified in dependence upon the control of the low-frequency luminance signal. For example, known filters comprise metal oxide semiconductor (MOS) transistors, preferably PMOS transistors. They are driven in the triode region so that the PMOS transistor can be used as a controllable resistor in this region. This is necessary to adjust the filter.

The operation of the PMOS transistors in the triode region has the drawback that the amplification of the high-frequency chrominance signal decreases with an increasing control of the low-frequency luminance signal. This non-linearity results in different amplifications of the chrominance signal in dependence upon the luminance of the picture signal, which is undesirable.

It is therefore an object of the invention to compensate the amplitude-dependent control of a filter.

The technical problem described hereinbefore and known from the state of the art is solved according to the invention in that detection means for detecting the control of the signal are provided and that variation means for varying the DC component of the signal are provided, wherein the non-linearity of the transfer function of the filtering means can at least be partly compensated by variation of the DC component of the signal. The invention is based on the recognition that the amplification in known filters is not only dependent on the control of the signal but also on the DC position of the signal.

The deterioration of the differential gain can at least be partly compensated according to the invention by shifting the DC component, or the working point of the signal. The signal consists of a low-frequency large signal and a high-frequency small signal superimposed on this large signal. The differential gain varies in dependence upon the amplitude of the low-frequency large signal. According to the invention, the DC position of the signal, corresponding to the working point of the filter, is varied in accordance with its amplitude so that an essentially uniform amplification of the small signal is obtained throughout the amplitude range of the signal. The detection means are coupled to the variation means, in which the amplification of the detected control is smaller than 1. This means that a variation of the control of the signal only results in a small variation of the working point of the filter. The shift of the working point amounts to only a few percent of the amplitude of the signal. For example, a shift of the working point of about 10 mV is obtained with a luminance signal of 400 mV. However, this shift results in a compensation of the non-linear amplification of the filter.

The signal preferably consists of a low-frequency large signal and a high-frequency small signal superimposed on the large signal. The filtering means amplify the small signal, in which the amplification of the small signal is dependent on the amplitude and the DC position of the signal. Advantageously, the large signal constitutes the luminance signal and the small signal constitutes the chrominance signal of a video signal.

Advantageously, the amplitude of the large signal can be detected by means of the detection means as defined in claim 2. The value of the maximum control of the overall signal is provided at the output of the full-wave rectifier. This value determines the control of the overall signal and hence the amplification error generated by the filter.

Filters as defined in claim 3 are often used. They provide the possibility of filtering the sound carrier but have a non-linearity of their amplification.

Variation means as defined in claim 4 are advantageous because the DC component of the signal can be easily adjusted by the voltage divider used.

The use of voltage/current network as defined in claim 5 is also advantageous because a voltage/current network is already present in many applications. For example, a voltage/current network in television receivers is used for adjusting the working point of the filter. This working point is adjusted by variation and matching of the MOSFETs used. When using the voltage/current network as defined in claim 5, the control of the signal detected by the detection means is converted into a current which, in its turn, is converted to a corresponding voltage for varying the DC component. This means that a coupling between detection means and variation means is obtained by means of the voltage/current network. The amplification of the detected control is smaller than 1, which means that the shift of the working point of the filter is smaller than the control of the signal.

An amplification by means of filters as defined in claim 6 is particularly advantageous. In such an amplifier, the input difference voltage can be converted into an output current.

The invention also relates to a method of compensating a non-linear transfer function of a filter of a video signal receiver, in which a signal is amplified, a signal amplitude is detected from the amplified signal, a variation of the DC component of the amplified signal is effected in dependence upon the detected signal amplitude, and the varied signal is filtered by means of the filter, wherein the non-linearity of the filter is at least partly compensated by variation of the DC component.

The invention further relates to the use of a compensation circuit or of the method in television receivers, video receivers or integrated circuits for sound carrier suppression, as described hereinbefore.

These and other aspects of the invention are apparent from and will be elucidated with reference to the embodiments described hereinafter.

IN THE DRAWING

The sole FIG. 1 is a block diagram for realizing the filter compensation.

FIG. 1 shows a compensation circuit for compensating the non-linear amplification of the small signal of a video signal. This video signal consists of a luminance signal (large signal) having a lower frequency, hereinafter referred to as low-frequency luminance signal, and a chrominance signal (small signal) having a higher frequency, hereinafter referred to is high-frequency chrominance signal, and a sound carrier signal. The chrominance signal is superimposed on the luminance signal. A video signal, particularly a composite video signal, is amplified by a transconductance amplifier 2, supplied via resistors 4a, 4b to a filter 16 in which it is filtered in accordance with the adjustments of the filter 16. The input signal $U_{in}$ is preferably converted by the filter into an output signal $U_{out}$ filtered by the sound carrier signal. To compensate the non-linearity of the filter 16, detection means 14, variation means 10 and a coupling circuit 12 are provided. The circuit operates as follows.

The detection means 14 consist of a full-wave rectifier. This full-wave rectifier comprises two diodes 14a, 14b which tap the signal on the signal lines. The peak value of the signal is present at the common tap of the diodes 14a, 14b. This means that the signal amplitude at the cathodes of the diodes 14a, 14b is measurable.

The coupling between detection means 14 and variation means 10 is constituted by the coupling means 12 constituting a current/voltage network. The coupling means 12 are fed by the voltage source 12c. The voltage taken from the full-wave rectifier 14 is converted into a current in the voltage/current converter 12b. This current is again converted into a voltage in the current/voltage converter 12a. The amplitude at the output of the current/voltage converter 12a is considerably smaller than the signal amplitude taken from the cathodes of the diodes 14a, 14b. For example, the signal amplitude is 400 mV and the voltage at the output of the current/voltage converter 12a is 10 mV. These 10 mV are supplied to the signal via the variation means 10 constituted by a voltage divider. A shift of the DC component of the signal in accordance with the voltage at the output of the current/voltage converter 12a is obtained by the voltage divider which is constituted by the resistors 10a, 10b.

Since the filter 16 amplifies the high-frequency small signal in accordance with the amplitude of the low-frequency large signal to a different extent, a distorted small signal is initially obtained at the output of the filter 16. However, since the filter 16 is dependent on the control of the large signal as well as on the DC position of the large signal, the non-linear amplification of the small signal can be realized by a shift of the working point of the filter 16, as is proposed by the invention. Due to the shift of the working point of the filter 16, which is obtained by changing the DC component of the signal in this case, the non-linear amplification of the filter is compensated in dependence upon the control of the signal.

Conventional filters without a compensation circuit according to the invention usually have a non-linearity of 6 to 8%. This means that a 6 to 8% smaller amplification of the small signal is obtained for large controls of the signal. The circuit according to the invention reduces this distortion to about 2 to 3%.

The invention has the advantage that a compensation of the non-linearity of the filter can be achieved with simple means.

LIST OF REFERENCE SIGNS $U_{in}$ input signal
$U_{out}$ output signal
2 transconductance amplifier
4a,b resistors
10 variation means
10a,b resistors
12 coupling circuit
12a,b current/voltage converter
12c voltage source
14 detection means
14a,b diodes
16 filter

The invention claimed is:

1. A compensation circuit for frequency filters, particularly IF frequency filters, sound subcarrier filters or sound subcarrier traps of a video signal receiver, particularly a television signal receiver, the compensation circuit comprising:
    amplifier means for amplifying a signal, particularly a composite video signal, wherein the signal includes a first signal component having a first frequency and a second signal component having a second frequency, wherein the first frequency is lower than the second frequency;
    filtering means for filtering a frequency range within the signal, the filtering means having a non-linear, signal-dependent transfer function for amplifying the second signal component without amplifying the first component;
    detection means for detecting a characteristic of the first signal component before the signal is filtered by the filtering means; and
    variation means for varying the DC component of the signal in dependence upon said characteristic by producing a DC voltage and combining the DC voltage with the signal before the signal is filtered by the filtering means;
    wherein the non-linearity of the transfer function of the filtering means is at least partly compensated by variation of the DC component of the signal.

2. A compensation circuit as claimed in claim 1, wherein the detection means comprises a full-wave rectifier, in which the control of the first signal component is detected at the output of the full-wave rectifier.

3. A compensation circuit as claimed in claim 1, wherein the filtering means are implemented as a sound carrier trap in which a sound carrier frequency of the signal are filtered by means of the filtering means.

4. A compensation circuit as claimed in claim 1, wherein the the variation means comprise a voltage divider, and the voltage divider is coupled to the signal, in which the DC position of the signal is varied by means of the voltage divider.

5. A compensation circuit as claimed in claim 1, wherein a voltage/current network is provided in which the DC position of the signal is varied by means of the voltage/current network in dependence upon the detected characteristic of the first signal component.

6. A compensation circuit as claimed in claim 1, wherein the amplifier means are constituted by a transconductance amplifier.

7. A compensation circuit as claimed in claim 1, wherein the characteristic of the first signal component is a signal amplitude of the first signal component.

8. A compensation circuit as claimed in claim 2, wherein the characteristic of the first signal component is a signal amplitude of the first signal component.

9. A method of compensating a non-linear transfer function of a filter, particularly an IF filter, an IF sound carrier filter or an IF frequency trap of a video signal receiver, in which a signal, particularly a composite video signal, wherein the signal includes a first signal component having a first frequency and a second signal component having a second frequency, wherein the first frequency is lower than the second frequency, is amplified, a signal amplitude of the first signal component is detected from the amplified signal before signal filtering, variation of a DC component of the amplified signal is effected in dependence upon the detected signal amplitude of the first signal component to produce a varied signal by producing a DC voltage and combining the DC voltage with the signal before signal filtering, and the varied signal is filtered by means of the filter to amplify the second signal component without amplifying the first signal component, wherein the non-linearity of the filter is at least partly compensated by variation of the DC component.

10. Use of the compensation circuit as claimed in claim 1 or of the method as claimed in claim 9 in television receivers, video receivers or integrated circuits for sound carrier suppression.

* * * * *